(12) United States Patent
Chen et al.

(10) Patent No.: US 10,364,330 B2
(45) Date of Patent: Jul. 30, 2019

(54) PROCESS TO PREPARE BIAXIALLY ORIENTED FILM

(71) Applicant: DSM IP ASSETS B. V., Heerlen (NL)

(72) Inventors: Hao Chen, Echt (NL); Alexander Antonius Marie Stroeks, Echt (NL); Roman Stepanyan, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 15/525,639

(22) PCT Filed: Nov. 12, 2015

(86) PCT No.: PCT/EP2015/076412
§ 371 (c)(1),
(2) Date: May 10, 2017

(87) PCT Pub. No.: WO2016/075225
PCT Pub. Date: May 19, 2016

(65) Prior Publication Data
US 2017/0327653 A1   Nov. 16, 2017

(30) Foreign Application Priority Data
Nov. 13, 2014   (EP) ..................................... 14193075

(51) Int. Cl.
*C08G 63/02*   (2006.01)
*C08J 5/18*   (2006.01)
*B29C 48/14*   (2019.01)

(52) U.S. Cl.
CPC ............... *C08J 5/18* (2013.01); *B29C 48/146* (2019.02); *C08J 2377/02* (2013.01); *C08J 2477/06* (2013.01)

(58) Field of Classification Search
USPC ....................................................... 528/502
See application file for complete search history.

(56) References Cited

U.S. PATENT DOCUMENTS

| | | |
|---|---|---|
| 3,983,306 A | 9/1976 | Nielinger et al. |
| 4,486,507 A | 12/1984 | Schumacher |

FOREIGN PATENT DOCUMENTS

| | | |
|---|---|---|
| DE | 198 14 924 | 10/1999 |
| EP | 0 764 678 | 3/1997 |
| JP | 3-158225 | 7/1991 |
| JP | 3-216326 | 9/1991 |
| JP | 6-262675 | 9/1994 |
| JP | 2917443 | 4/1999 |

OTHER PUBLICATIONS

International Search Report for PCT/EP2015/076412 dated Apr. 2, 2016, 4 pages.
Written Opinion of the ISA for PCT/EP2015/076412 dated Apr. 2, 2016, 8 pages.
Kohjin Co Ltd: "Thermally shrinkable polyamide film for wrapping food—prepd. by melt extruding co-polyamide prepd. from epsilon-caprolactam and laurolactam, biaxially stretching, cooling and heat-treating", *WPI World Patent Information Derwent*, vol. 45, No. 87, Jun. 10, 1987, 1 page.
P. Scarfato et al., "Influence of Co-monomer Structure on Properties of Co-polyamide Packaging Films", Packaging Technology and Science, John Wiley & Sons Ltd, UK, vol. 15, Jan. 1, 2002, pp. 9-16.

*Primary Examiner* — Terressa Boykin
(74) *Attorney, Agent, or Firm* — Nixon & Vanderhye P.C.

(57) ABSTRACT

Processes are disclosed for preparing biaxially oriented film by forming a polymer melt of a composition which includes at least 50 wt % with respect to the total amount of the composition of a copolyamide having at least 75 wt. % monomeric units derived from either (i) caprolactam or (ii) hexamethylene diamine and adipic acid, each of which further includes units derived from diamines X and/or diacids Y and/or aminoacids Z in a summed amount of between 0.2 to 25 wt %, followed sequentially by casting and quenching a film of the polymer melt, MD-stretching of the film, TD-stretching the film, cooling the film after TD-stretching, and heat setting the biaxially oriented film. The resulting biaxially oriented film exhibits attributes suitable for use as food packaging.

11 Claims, 1 Drawing Sheet

PROCESS TO PREPARE BIAXIALLY ORIENTED FILM

This application is the U.S. national phase of International Application No. PCT/EP2015/076412 filed Nov. 12, 2015 which designated the U.S. and claims priority to EP Patent Application No. 14193075.0 filed Nov. 13, 2014, the entire contents of each of which are hereby incorporated by reference.

This invention relates to a process to prepare biaxially oriented film, as well as a film obtainable by the process, as well as flexible packaging comprising the film.

Processes to prepare biaxially oriented films are known in the art and for example described in U.S. Pat. No. 5,126,211. U.S. Pat. No. 5,126,211 describes a process for preparing a biaxially oriented polyamide film in which heat-setting is performed at a temperature which is 10 to 40° C. lower than the melting point of the film. This results in a polyamide film having a more uniform heat shrinkage across the entire width of the film. However, this method requires an extra heat setting step, which requires modification of existing biaxially oriented polyamide film lines.

EP0764678B1 discloses biaxially oriented polyamide films and a method of production in which a cooling process is interposed between the transverse drawing (also referred to as TD stretching) and the heat-setting process. This results in a film showing uniform physical and chemical properties in the transverse direction by suppressing the bowing phenomenon which occurs in the process of transverse drawing. A disadvantage of this process is that upon cooling the film after TD stretching stress is built up in the film, which results in frequent breakage of the film during or after TD stretching. The process according to EP0764678B1 thus generates waste, and is inefficient as the process has to be stopped frequently. Mainly because of those frequent breakages, the process proposed in EP0764678B1 has not gained a broad acceptance in the industry and the bowing phenomenon still remains a problem.

Bowing phenomenon is well-described in the literature (e.g., in T. Yamada, C. Nonomura, J. of Applied Polymer Science, vol. 52, p. 1393, (1994)). If a straight line is drawn in the transverse direction along the whole width of the film before it is subjected to TD drawing, it attains a form of a bow after TD drawing step; hence the word "bowing".

The bowing phenomenon is the major cause of the anisotropy of the sequentially biaxially oriented film characteristics, such as, e.g., hot air shrinkage in the directions of +45° and −45° relative to the machine direction (positive angles correspond to the clockwise direction relative to the machine direction). Such anisotropy in the properties is highly undesirable in, e.g., printing process, as is also described in EP0764678B1. In general, the degree of anisotropy is limited in the middle portion of an as produced film, but increases towards both the edges.

It is thus an object of the present invention to have a process for preparing biaxially oriented film, in which less breakage occurs, while showing a low amount of bowing.

This has been achieved by providing a process for preparing a biaxially oriented film, comprising the following steps:
a) Melting a composition comprising at least 50 wt % with respect to the total amount of the composition of a copolyamide comprising:
i. At least 75 wt % monomeric units derived from caprolactam, and further monomeric units derived from diamines X and/or diacids Y and/or aminoacids Z in a summed amount of between 0.2 to 25 wt %; or
ii. At least 75 wt % monomeric units derived from hexamethylene diamine and adipic acid, and further monomeric units derived from diamines X and/or diacids Y and/or aminoacids Z in a summed amount of between 0.2 to 25 wt %;
into a polymer melt;
b) Casting the polymer melt through a planar die to form a film of at least one layer and subsequently quenching the film to a temperature of below Tg of the copolyamide;
c) Stretching the film obtained after quenching in a direction parallel to the machine (MD-stretching) with a factor of at least 2 at a temperature of at least Tg of the copolyamide;
d) Stretching the film obtained after MD stretching in a direction transversal to the machine (TD-stretching) with a factor of at least 2 at a temperature of at least Tg+10 deg C. of the copolyamide;
e) Cooling the obtained film after TD-stretching;
f) Heat setting the film obtained after cooling, at a temperature of between Tm−70° C. and Tm of the copolyamide;
in which Tg and Tm of the copolyamide are determined as described by ASTM D3418-03.

This process allows for continuous production of sequentially stretched biaxially oriented film which exhibits less breakage than compared to processes as described in the prior art. Another advantage is that the film exhibits less bowing. Yet another advantage is that the film, upon cutting, shows high quality edges.

Width of the film is understood to be perpendicular to the machine direction. Length of the film is understood to be parallel to machine direction. Machine direction is a known term for a person skilled in the art.

Further monomeric units derived from diamines X and/or diacids Y and/or aminoacids Z is hereby understood to be monomeric units different from the at least 75 wt % monomeric units derived from caprolactam in option i) or the at least 75 wt % monomeric units derived from hexamethylene diamine and adipic acid in option ii).

The individual steps will be further elucidated and all embodiments of the individual process steps as described are hereby explicitly combined as it is clear to a person skilled in the art that combinations of the preferred embodiments of the process steps are considered part of the invention.

Step a)

Melting is hereby understood to heat a composition to a temperature of at least above Tm of the copolyamide. This can for example be achieved by an extruder. Preferably the composition comprises at least 90 wt % with respect to the total amount of the composition of a copolyamide, more preferably at least 95 wt %, and even more preferred at least 98 wt %.

Step b)

Casting through a planar die is for example performed by extruding the abovementioned melt through a planar die to form a film. Planar die is understood to be a die with its largest width in a horizontal position. The film is quenched to a temperature of below Tg of the copolyamide, which can be performed for example by bringing the film into contact with a metal chill roll, having temperature below Tg of the abovementioned copolyamide.

Step c)
MD-stretching is performed at a temperature of at least Tg of the copolyamide, preferably at least Tg+10° C., more preferably at least Tg+20° C., as this facilitates the film drawability. MD stretching may be performed at a temperature as high as Tg+100° C., as long as the temperature is below Tm of the copolyamide or melting temperature of a plastic of another layer if present. MD-stretching is performed with a factor of at least 2, preferably at least 2.5 and more preferably at least 3. The factor may be as high as 4.

Step d)
TD-stretching is performed at a temperature of at least Tg+10° C. of the copolyamide, preferably at least Tg+20° C., and even more preferred at least Tg+40° C., as this facilitates the film drawability. Preferably, the temperature of TD-stretching is higher than the temperature of MD-stretching, as this results in improved drawability of the film. TD stretching may be performed at a temperature as high as Tg+100° C., as long as the temperature is below Tm of the copolyamide or melting temperature of a plastic of another layer if present. TD-stretching is performed with a factor of at least 2, preferably at least 2.5 and more preferably at least 3. The factor may be as high as 4.

Step e)
In step e) the film is cooled. With cooling herein is understood that the temperature of step e) is decreased with respect to the temperature reached at the end of step d). Preferably, cooling is performed to a temperature of at least 10° C. lower than the temperature reached at the end of step d).

More preferably, cooling is performed to a temperature at least 10° C. lower than the temperature reached at the end of step d) and this temperature is maintained on a length of the film of at least 1× width of the film.

Preferably, cooling after TD-stretching is performed until a temperature of at most Tg+10° C. of the copolyamide is reached, preferably a temperature of at most Tg is reached and more preferably a temperature of at most Tg−10° C. is reached. Preferably, cooling is performed until a film of a length of at least 1× the width of the film, preferably a length of at least 2× the width of the film, has a temperature of less than Tg of the polyamide, preferably less than Tg−10° C. Preferably, the speed of cooling is at least 10° C./s. Preferably, the cooling step is performed immediately after step d). Immediately is here understood as fast as hardware allows cooling after TD-stretching.

Step f)
After cooling the film is heat-set at a temperature of between Tm−70° C. and Tm of the copolyamide, preferably at a temperature of between Tm−15° C. and Tm, as this allows for reaching the equilibrium level of crystallinity of the film. Preferably heat-set is performed during at least 1 second, more preferably at least 2 seconds, even more preferred at least 3 seconds, while maintaining the film at a temperature of between Tm−70° C. and Tm of the polyamide, preferably at a temperature of between Tm−15° C. and Tm.

Step f) is essential to obtain a film with good dimensional stability, i.e. low hot air shrinkage in transversal direction. The process according to the invention results in a film which is distinguished from so-called shrinkable films, as it keeps its dimensions upon heating. Shrinkable films will decrease their dimensions when subjected to hot air or hot water, which is undesirable for the films obtained by the process according to the invention.

To circumvent the anisotropy problem, often only a limited central part of the film is employed in, e.g., printing applications. Increasing the width of that portion, is highly desirable, as this leads to less waste.

Option i) of the composition in the present invention is based on at least 75 wt % monomeric units derived from caprolactam, and the copolyamide may be denoted as for example, PA-6/XY, PA-6/Z, PA-6/Z/XY. Option ii) is based on at least 75 wt % monomeric units derived from hexamethylene diamine and adipic acid, and the copolyamide may be denoted as for example PA-66/XY, PA-66/Z, PA-66/XY/Z. The copolyamide may also be a blend of copolyamides. Nomenclature is as described in Nylon Plastics Handbook, Melvin I. Kohan, Hanser Publishers, 1995, page 5. Monomeric unit derived from caprolactam is also known by the chemical formula (1):

$$—HN(CH_2)_5CO— \quad (1)$$

Monomeric unit derived from hexamethylene diamine and adipic acid is also known by the chemical formula (2), and may also be derived from the salt of hexamethylene diamine and adipic acid:

$$—HN(CH_2)_6NHCO(CH_2)_4CO— \quad (2)$$

Monomeric units derived from an aminoacid include lactams, which will upon ring opening constitute an aminoacid. Suitable aminoacids Z include aminodecanoic acid, aminoundecanoic acid and aminododecanoic acid.

The composition may contain additives which for example include anti-block agents as known to a person skilled in the art, colorants, oxygen scavengers, stabilizers. The composition may also comprise further polyamides and or copolyamides.

Preferably, the process is performed with a composition comprising at least 50 wt %, more preferably at least 90 wt %, even more preferred at least 95 wt %, and most preferred at least 98 wt %, with respect to the total amount of the composition of a copolyamide comprising:
  i. At least 80 wt %, more preferably at least 85 wt %, even more preferred at least 90 wt % monomeric units derived from caprolactam, and further monomeric units derived from diamines X and/or diacids Y and/or aminoacids Z in a summed amount of between 0.5 to 10 wt %, more preferably between 0.8 to 5 wt %; or
  ii. At least 80 wt %, more preferably at least 85 wt %, even more preferred at least 90 wt % monomeric units derived from hexamethylene diamine and adipic acid, and further monomeric units derived from diamines X and/or diacids Y and/or aminoacids Z in a summed amount of between 0.5 to 10 wt %, more preferably between 0.8 to 5 wt %.

Preferably, the process is performed with a composition comprising at least 50 wt %, more preferably at least 90 wt %, even more preferred at least 95 wt %, and most preferred at least 98 wt %, with respect to the total amount of the composition of a copolyamide comprising:
  i. At least 75 wt % preferably at least 80 wt %, more preferably at least 85 wt %, even more preferred at least 90 wt % monomeric units derived from caprolactam, and further monomeric units derived from hexamethylene diamine and adipic acid in a summed amount of between 0.2 to 25 wt %, preferably between 0.5 to 10 wt %, more preferably between 0.8 to 5 wt %.

This copolyamides, also denoted as PA6/66 is readily available and has the advantage that more stable film drawing process with less film breakages can be performed as compared to PA6 homopolymer.

In another embodiment, the composition employed in the process comprises at least 50 wt %, preferably at least 90 wt %, more preferably at least 95 wt %, and even more preferred at least 98 wt %, with respect to the total amount of the composition of a copolyamides comprising:
  i. At least 75 wt %, preferably at least 80 wt %, more preferably at least 85 wt %, even more preferred at least 90 wt % monomeric units derived from caprolactam, and further monomeric units derived from diamines X and/or diacids Y and/or aminoacids Z in a summed amount of between 0.5 to 10 wt %, more preferably between 0.8 to 5 wt %; or
  ii. At least 75 wt %, preferably at least 80 wt %, more preferably at least 85 wt %, even more preferred at least 90 wt % monomeric units derived from hexamethylene diamine and adipic acid, and further monomeric units derived from diamines X and/or diacids Y and/or aminoacids Z in a summed amount of between 0.5 to 10 wt %, more preferably between 0.8 to 5 wt %;

Wherein diamine X or diacid Y or an aminoacid Z is cyclic, as this allows presence of X, Y or Z in amounts less than compared to presence of non-cyclic X, Y or Z, which results in more favorable properties, such as mechanical properties as well as gas barrier properties. Cyclic is hereby understood to have a ring-like chemical structure upon presence in the polyamide, such as aromatic structures as well as alicyclic structures.

Monomeric unit based on caprolactam is not cyclic as caprolactam will open its structure when forming a polyamide and is thus present as a non-cyclic monomeric unit in a polyamide.

Preferably, the further monomeric unit derived from diamines X is chosen from the group of isophoronediamine (IPD), bis-(p-aminocyclohexane)methane (PACM), 2,2-Di-(4-aminocyclohexyl)-propane, 3,3'-dimethyl-4-4'-diaminodicyclohexylmethane, p-xylylenediamine, m-xylylenediamine, and 3,6-bis(aminomethyl)norbornane. Preferably, the further monomeric unit derived from diacid Y is chosen from the group of isophthalic acid (I), terephthalic acid (T), 4-methylisophthalic acid, 4-tert-butylisophthalic acid, 1,4-naphthalenedicarboxylic acid and 2,6-naphthalenedicarboxylic acid.

More preferred, the further monomeric units derived from diamines X and diacids Y in i) or ii) are chosen from a combination of
  isophoronediamine (IPD), bis-(p-aminocyclohexane) methane (PACM), 2,2-Di-(4-aminocyclohexyl)-propane, 3,3'-dimethyl-4-4'-diaminodicyclohexylmethane, p-xylylenediamine, m-xylylenediamine, and 3,6-bis (aminomethyl)norbornane; and
  isophthalic acid (I), terephthalic acid (T), 4-methylisophthalic acid, 4-tert-butylisophthalic acid, 1,4-naphthalenedicarboxylic acid and 2,6-naphthalenedicarboxylic acid;
  in a summed amount of at least 0.2 wt %, preferably at least 0.5 wt %, more preferably at least 0.8 wt % and most preferred at least 0.95 wt %,
as this allows for even lower amounts of further monomeric units derived from diamine X and diamine Y being present and keeps the mechanical properties of the film sufficient.

The present invention also relates to a biaxially oriented film, obtainable by the process as described above. The preferred embodiments with respect to the copolyamides, as well as the preferred embodiments with respect to the processing steps are hereby explicitly combinable, into embodiments incorporated in this invention.

The biaxially oriented film, obtainable by the process, exhibits a low anisotropy (H) in hot air shrinkage (HAS) in a wider part of the film.

Anisotropy in hot air shrinkage can be measured according to formula (I)

$$H = \left| \frac{HAS_{+45°} - HAS_{-45°}}{(HAS_{+45°} + HAS_{-45°})/2} \right| \times 100\% \qquad (I)$$

where HAS is measured on diagonals of a 10 cm×10 cm square sample, with the sides of the square parallel to MD and TD directions, after subjecting the square to air of 160° C. during 5 minutes.

$HAS_{+45°}$ and $HAS_{-45°}$ are the Hot Air Shrinkage (HAS) values (%) in the directions having 45° angle clockwise (+45°) and counterclockwise (−45°) from the machine direction. The HAS values are measured on a film which is conditioned for 12 to 28 hours at a temperature of 23° C. and a relative humidity of 50%. A piece of film is obtained by cutting a square 10 cm×10 cm of the film around a point of interest, with the sides of the square parallel to MD and TD directions. Then the lengths of the diagonals of the square are measured before ($L_{0(+45°)}$ and $L_{0(-45°)}$) and after ($L'_{(+45°)}$ and $L'_{(-45°)}$) conditioning a sample in an oven with air having a temperature of 160° C. for 5 minutes. Afterward, the HAS values are calculated according to the formulas (IIa) and (IIb)

$$HAS_{+45°} = \frac{L_{0(+45°)} - L'_{(+45°)}}{L_{0(+45°)}} \times 100\% \qquad (IIa)$$

$$HAS_{-45°} = \frac{L_{0(-45°)} - L'_{(-45°)}}{L_{0(-45°)}} \times 100\% \qquad (IIb)$$

Surprisingly, the inventors have found that upon preparation of a sequentially stretched biaxially oriented film with a width of at least 4 meter, the film exhibits a low anisotropy (H) in a significant part of the film, which allows high quality printing. Another advantage is that the process according to the invention shows a low bowing amplitude. Bowing amplitude can be determined by applying a first straight line (1) perpendicular to the MD direction before step c) and determining the largest deviation (dev) of this line from a second straight line (2) perpendicular to MD direction connecting the edges of the first line after step f). This has been exemplified in FIG. 1. The largest deviation is hereby defined as bowing amplitude and is expressed in millimeters.

FIG. 1 shows a part of a film in which a straight line has been applied. After performing step c) to step f) this line may no longer be straight and the deviation as shown as (dev) in FIG. 1 is a measure for the bowing amplitude.

The biaxially oriented film according to the invention may be a monolayer or a multilayer. Other layers may be present such as polyamide, such as for example polyamide-6 or polyamide-66, polyethylene, EVOH, as well as tie layers. These may be directly casted via a die in step b) or for example laminated separately preparation of the individual layers. Multilayer films have the advantage that properties of individual layers can be combined, which may for example lead to higher barrier properties.

Measurement of Tg and Tm of copolyamide is performed by method described in ASTM D3418-03: Tg corresponds to the midpoint temperature Tmg and Tm corresponds to the melting peak temperature Tmp, as described in the section 10 of ASTM D3418-03. Both Tg and Tm are measured in a temperature scan at 10° C./min.

The biaxially oriented film according to the invention is highly suitable for flexible packaging, as it allows easily printing of the film, with less distortion of the picture on the film. The invention thus also relates to the film which is at least partially printed, as well as flexible packaging comprising this film. The invention also relates to food-packaging. Another advantage of the film according to the invention is that upon cutting of the film, high quality edges are obtained.

EXAMPLES 3-layered films were prepared. The inner layer was composed of homopolyamide PA6 or copolyamide 6/IPDT with 1 wt % comonomers. The outer layers composition contained the same (co)polyamide as the inner layer plus 1 wt % antiblock masterbatch in which the weight percentage is with respect to the total weight of composition. Antiblock masterbatch is a conventional masterbatch containing 20 wt % silica with respect to the total weight of antiblock masterbatch, for the purpose of improving the slip and antiblock characteristics of the resulting film.

The properties of the (co)polyamides used are given in Table 1. Polyamide-6/IPDT is a copolyamide in which 1.0 wt % monomeric units are derived from isophorone diamine X and terephthalic acid Y, besides 99 wt % monomeric units derived from caprolactam. Polyamide-6 is a homopolyamide consisting of monomeric units derived from caprolactam

TABLE 1

Properties of (co)polyamides

|  | Relative viscosity in 90 wt % formic acid | Tg | Tm |
|---|---|---|---|
| PA6 homopolymer | 2.7 | 53° C. | 220° C. |
| PA6/IPDT copolymer | 2.8 | 54° C. | 219° C. |

The cooling temperature during step e) is shown in table 2. The difference in temperature between end of step d) and lowest temperature in step e) is shown. Results are also shown in table 2.

TABLE 2

Compositions and results

|  | Ex 1 according to invention | Ex 2 according to invention | Ex 3 according to invention | Comparative example A | Comparative Example B | Comparative Example C |
|---|---|---|---|---|---|---|
| Outer layers | PA-6/IPDT + antiblock | PA-6/IPDT + antiblock | PA-6/IPDT + antiblock | PA-6/IPDT + antiblock | PA-6 + antiblock | PA-6 + antiblock |
| Middle layer | PA-6/IPDT | PA-6/IPDT | PA-6/IPDT | PA-6/IPDT | PA-6 | PA-6 |
| Cooling in step e) | 10° C. | 20° C. | 30° C. | 0° C.; no cooling | 10° C. | 0° C.; no cooling |
| Bowing amplitude | 226 mm | 231 mm | 226 mm | 246 mm | 257 mm | 255 mm |

All films exhibited a hot air shrinkage of less than 2.7% in transversal direction, as measured at 160° C. for 5 minutes according to ASTM D 1204-02.

The process according to the invention results in a film with a low bowing amplitude. Examples 1, 2 and 3 clearly show that with a copolyamide and cooling in step e) a film is obtained with a bowing amplitude significantly lower than compared to a process in which no cooling was performed (Comparative A, or comparative C in which no cooling and a homopolyamide was used). The bowing amplitude was also significantly lower compared to the use of a homopolyamide in combination with cooling (Comparative B).

The invention claimed is:

1. A process for preparing a biaxially oriented film, comprising the following steps:
   a) forming a polymer melt by melting a polymer composition comprising at least 50 wt % with respect to the total amount of the composition of a copolyamide comprising:
      (i) at least 75 wt % monomeric units derived from caprolactam, and further monomeric units derived from diamines X and/or diacids Y and/or aminoacids Z in a summed amount of between 0.2 to 10 wt %; or
      (ii) at least 75 wt % monomeric units derived from hexamethylene diamine and adipic acid, and further monomeric units derived from diamines X, diacids Y and/or aminoacids Z in a summed amount of between 0.2 to 10 wt %; wherein
      at least one of the further monomeric units derived from diamines X and/or diacids Y and/or amino acids Z is cyclic;
   b) casting the polymer melt through a planar die to form a film of at least one layer and subsequently quenching the film to a temperature of below Tg of the copolyamide;
   c) stretching the film obtained after quenching in a direction parallel to a machine direction (MD-stretching) with a factor of at least 2 at a temperature of at least Tg of the copolyamide to obtain a MD-stretched film;
   d) stretching the MD-stretched film obtained after MD stretching in a direction transverse to the machine direction (TD-stretching) with a factor of at least 2 at a temperature of at least Tg+10° C. of the copolyamide to obtain a biaxially stretched film;
   e) cooling the obtained biaxially stretched film after TD-stretching at a temperature of at least 10° C. lower than the temperature of the TD-stretching in step d); and
   f) heat setting the biaxially stretched film obtained after cooling, at a temperature of between Tm−70° C. and Tm of the copolyamide to obtain a biaxially oriented film; wherein
   the temperatures Tg and Tm of the copolyamide are determined as described by ASTM D3418-03.

2. The process according to claim 1, wherein step e) is practiced by cooling the biaxially stretched film after TD-stretching to a temperature of at most Tg° C., and maintaining the temperature of at most Tg on a length of the biaxially stretched film of at least 1× width of the biaxially stretched film.

3. The process according to claim 1, wherein the polymer composition comprises at least 90 wt % of the copolyamide with respect to the total amount of the polymer composition.

4. The process according to claim 1, wherein the further monomeric units derived from the diamines X and diacids Y are cyclic.

5. The process according to claim 1, wherein the further monomeric units derived from the diamines X are selected from the group consisting of isophoronediamine (IPD), bis-(p-aminocyclohexane)methane (PACM), 2,2-di-(4-aminocyclohexyl)-propane, 3,3'-dimethyl-4-4'-diaminodicyclohexylmethane, p-xylylenediamine, m-xylylenediamine and 3,6-bis(aminomethyl)norbornane.

6. The process according to claim 1, wherein the further monomeric units derived from the diacids Y are selected from the group consisting of isophthalic acid (I), terephthalic acid (T), 4-methylisophthalic acid, 4-tert-butylisophthalic acid, 1,4-naphthalenedicarboxylic acid and 2,6-naphthalenedicarboxylic acid.

7. The process according to claim 1, wherein the further monomeric units derived from the diamines X, diacids Y and/or aminoacids Z are present in the monomeric units i) or ii) in a summed amount of between 0.5 to 10 wt %.

8. The process according to claim 1, wherein the further monomeric units derived from the diamines X and diacids Y in the monomeric units i) or ii) are comprised of a combination of:

(1) at least one monomeric unit derived from a compound selected from the group consisting of isophoronediamine (IPD), bis-(p-aminocyclohexane)methane (PACM), 2,2-Di-(4-aminocyclohexyl)-propane, 3,3'-dimethyl-4-4'-diaminodicyclohexylmethane, p-xylylenediamine, m-xylylenediamine, and 3,6-bis(aminomethyl)norbornane; and (2) at least one monomeric unit derived from a compound selected from the group consisting of isophthalic acid (I), terephthalic acid (T), 4-methylisophthalic acid, 4-tert-butylisophthalic acid, 1,4-naphthalenedicarboxylic acid and 2,6-naphthalenedicarboxylic acid; wherein the monomeric units (1) and (2) are present in a summed amount of between 0.8 to 5 wt %.

9. The process according to claim 2, wherein step e) comprises maintaining the temperature of at most Tg on a length of the biaxially stretched film of at least 2× width of the biaxially stretched film.

10. The process according to claim 1, wherein the temperature of the TD-stretching in step d) is higher than the temperature of the MD-stretching in step c).

11. The process according to claim 7, wherein the further monomeric units derived from the diamines X and/or the diacids Y and/or the aminoacids Z are present in the monomeric units i) or ii) in a summed amount of between 0.8 to 5 wt %.

* * * * *